(12) United States Patent  
Chou

(10) Patent No.: US 10,073,789 B2  
(45) Date of Patent: Sep. 11, 2018

(54) METHOD FOR LOAD INSTRUCTION SPECULATION PAST OLDER STORE INSTRUCTIONS

(71) Applicant: Oracle International Corporation, Redwood City, CA (US)

(72) Inventor: Yuan Chou, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 263 days.

(21) Appl. No.: 14/838,561

(22) Filed: Aug. 28, 2015

(65) Prior Publication Data

US 2017/0060755 A1    Mar. 2, 2017

(51) Int. Cl.
| | |
|---|---|
| *G06F 12/08* | (2016.01) |
| *G06F 12/12* | (2016.01) |
| *G06F 12/0875* | (2016.01) |
| *G06F 12/0811* | (2016.01) |
| *G06F 12/128* | (2016.01) |
| *G06F 12/0862* | (2016.01) |

(52) U.S. Cl.
CPC ...... *G06F 12/0875* (2013.01); *G06F 12/0811* (2013.01); *G06F 12/0862* (2013.01); *G06F 12/128* (2013.01); *G06F 2212/283* (2013.01); *G06F 2212/452* (2013.01); *G06F 2212/6026* (2013.01)

(58) Field of Classification Search
CPC ............ G06F 12/0875; G06F 12/0811; G06F 12/128; G06F 12/0862; G06F 2212/6026; G06F 2212/283; G06F 2212/452
See application file for complete search history.

(56) References Cited

U.S. PATENT DOCUMENTS

| | | | | |
|---|---|---|---|---|
| 7,162,613 | B2 | 1/2007 | Yeh | |
| 7,185,178 | B1 | 2/2007 | Barreh | |
| 7,603,527 | B2 * | 10/2009 | Hily | ............... G06F 9/3824 |
| | | | | 711/158 |
| 9,395,991 | B2 * | 7/2016 | Jackson | ............... G06F 9/3834 |

(Continued)

OTHER PUBLICATIONS

Patterson, et al., "Computer Organization and Design: The hardware/software interface," Third Edition, Elsevier, Inc., 2005, p. 443.

(Continued)

*Primary Examiner* — Michael Alsip  
(74) *Attorney, Agent, or Firm* — Meyertons, Hood, Kivlin, Kowert & Goetzel, P.C.

(57) ABSTRACT

A system includes a memory, a cache including multiple cache lines; and a processor. The processor may be configured to retrieve, from a first cache line, a first instruction to store data in a memory location at an address in the memory. The processor may be configured to retrieve, from a second cache line, a second instruction to read the memory location at the address in the memory. The second instruction may be retrieved after the first instruction. The processor may be configured to execute the second instruction at a first time dependent upon a value of a first entry in a table, wherein the first entry is selected dependent upon a value in the second cache line. The processor may be configured to execute the first instruction at a second time, after the first time, and invalidate the second instruction at a third time, after the second time.

20 Claims, 8 Drawing Sheets

(56) References Cited

U.S. PATENT DOCUMENTS

| | | |
|---|---|---|
| 2004/0044881 A1 | 3/2004 | Maier |
| 2004/0193849 A1 | 9/2004 | Dundas |
| 2010/0293347 A1* | 11/2010 | Luttrell ................ G06F 9/3851 |
| | | 711/156 |
| 2010/0332806 A1* | 12/2010 | Golla .................... G06F 9/3838 |
| | | 712/216 |
| 2014/0380023 A1* | 12/2014 | Smaus ................. G06F 9/3826 |
| | | 712/216 |

OTHER PUBLICATIONS

Bryant, et al., "Computer Systems: A Programmer's Perspective," Second Edition, Pearson, 2011, p. 499.

* cited by examiner

METHOD FOR LOAD INSTRUCTION SPECULATION PAST OLDER STORE INSTRUCTIONS

BACKGROUND

Field of the Invention

The embodiments herein relate to processors and, more particularly, to a method for speculative execution of instructions.

Description of the Related Art

Many computing systems include processors that allow instructions to be executed in an order that is different from the original program order. This re-ordering of instructions may allow a newer instruction whose operands are ready to be executed ahead of an older instruction that is waiting for one of its operands to become ready. For example, an instruction to store data in a given memory location may require time to decode a virtual address for the given memory location into a physical address. Instead of waiting for the store instruction to execute, the processor may fetch the next instruction and begin its execution.

In some processing cores, however, load instructions cannot be executed until addresses of all store instructions in the pipeline have been determined. This is to ensure that the addresses targeted by all the older store instructions are known by the time the load instruction executes, at which point, the processor checks the target address for the load to determine whether data should be obtained from one of the older store instructions or from a memory. If a load instruction executes before an older store instruction with a same target address, then the processor will read invalid data.

SUMMARY

Various embodiments of a system, a method and an apparatus are disclosed in which the system may include a memory, an instruction cache including a plurality of cache lines; and a processor. The processor may be configured to retrieve, from a first cache line of the plurality of cache lines, a first instruction to store data in a memory location at an address in the memory. The processor may be configured to retrieve, from a second cache line of the plurality of cache lines, a second instruction to read the memory location at the address in the memory. The second instruction may be retrieved subsequent to retrieving the first instruction. The processor may be configured to execute the second instruction at a first time dependent upon a value of a first entry in a first table, wherein the first entry in the first table is selected dependent upon a value included in the second cache line. The processor may be configured to execute the first instruction at a second time, wherein the second time is later than the first time, and invalidate the second instruction at a third time, wherein the third time is later than the second time.

In a further embodiment, the processor may be further configured to increment a second entry in a second table in response to executing the second instruction, wherein the second entry in the second table is selected dependent upon the address. The processor may also be configured to read the second entry in the second table in response to executing the first instruction.

In another embodiment, to invalidate the second instruction, the processor may be further configured to set a flag in a third entry in a third table in response to a determination that a value of the second entry in the second table is greater than zero. The processor may also be configured to read the third entry in the third table in response to committing the second instruction at a fourth time, wherein the fourth time is later than the third time.

In one embodiment, in response to a determination that the flag in the third entry is set, the processor may be further configured to modify the value of the first entry in the first table, and to invalidate the second instruction. In another embodiment, the processor may be further configured to increment a fourth entry in a fourth table in response to executing the second instruction, wherein the second entry in the second table is selected dependent upon a first portion of bits of the address, wherein the fourth entry in the fourth table is selected dependent upon a second portion of bits of the address, and wherein the first portion of bits of the address and the second portion of bits of the address are different.

In a further embodiment, the processor may be further configured to read the fourth entry in the fourth table in response to executing the first instruction, and to set a flag in a third entry in a third table in response to a determination that both a value of the second entry and a value of the fourth entry are greater than zero. In one embodiment, the first table may include a plurality of entries. Each entry of the plurality of entries may correspond to a respective cache line of the plurality of cache lines.

BRIEF DESCRIPTION OF THE DRAWINGS

The following detailed description makes reference to the accompanying drawings, which are now briefly described.

Figure 1:
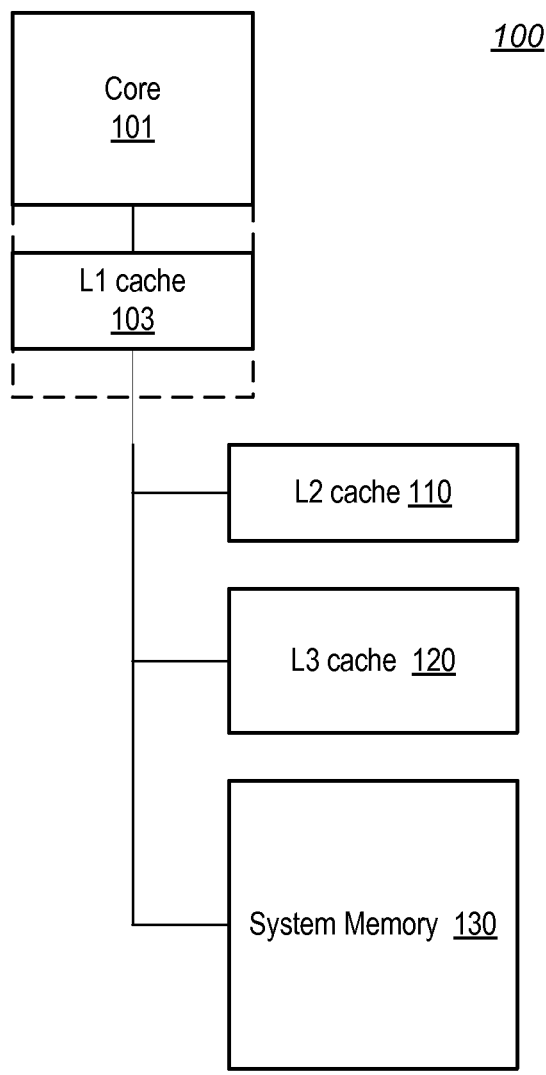
FIG. 1 illustrates a block diagram of an embodiment of a processor memory path.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Generally speaking, a processor core (or simply, a "core") may refer to a unit of a processor that is capable of executing program instructions and processing data independently of other processor cores within the processor, such that multiple cores may execute instructions concurrently. Performance of a processing core may be impacted by a multitude of factors, including processor clock speed, a number of cores included in the processor, and speed of the memory accesses. One method for improving performance is by allowing an out-of-order execution of program instructions. For example, a given software process may include one or more memory store instructions and load instructions. Depending on a type of memory these instructions operate on, a store instruction may take longer to complete than a load instruction. This may be particularly true when the type of memory is non-volatile memory, such as, for example, flash memory in which writing data may take significantly longer than reading data.

Allowing load instructions to be picked for execution ahead of older store instructions potentially improves performance since it allows load instructions (which may be part of a critical path) to be issued earlier. If, however, the load instruction has the same data address as an older store instruction, the load instruction may incorrectly read stale data from the cache hierarchy instead of receiving the correct data from the store instruction. Mechanisms for detecting and recovering from this situation are desired to handle such mispredictions. Since mispredictions may impact performance, a good prediction mechanism for deciding whether a particular load instruction should be allowed to be picked for execution ahead of older store instructions is sought.

It is noted that, as used herein, an "issued," "issuing," or to "issue" an instruction refers to selecting an instruction to be executed by a processor core. In a processor core that only supports in-order execution, issuing may consist of selecting a next instruction in a series of instructions. In a processor core that allows out-of-order processing, the core may include circuitry that selects an instruction to be issued ahead of a previously received instruction if the previously received instruction is stalled (e.g., cannot start or complete execution due to a resource limitation). In the embodiments presented herein, out-of-order processing of instructions is permitted.

Embodiments of a method for predicting if a particular load instruction should be picked for execution ahead of older store instructions are contemplated. In addition, embodiments of methods for detecting and recovering from a load instruction misprediction are presented herein.

A processor and memory system are illustrated in FIG. 1. In the illustrated embodiment, system 100 includes core 101 coupled to L1 cache 103. L1 cache 103 is further coupled to L2 cache 110, L3 cache 120 and system memory 130. In various embodiments, system 100 may include multiple integrated circuits (ICs) coupled on one or more circuit boards or may be implemented as a single IC.

Core 101 may be configured to execute instructions and to process data according to a particular Instruction Set Architecture (ISA). In some embodiments, core 101 may be configured to implement the SPARC® V9 ISA, although in other embodiments it is contemplated that any desired ISA may be employed, such as x86, PowerPC® or ARM®, for example. In various embodiments, core 101 may include a single core or may correspond to a core complex including any suitable number of cores. Core 101 may include hardware for supporting multitasking or multithreading. Such multithreaded cores are capable of supporting more than one software process (also referred to herein as a "software thread" or simply "thread") at a time. Core 101 may also include hardware for implementing out-of-order execution of program instructions, including circuits for predicting when a load instruction may be executed before a previously received store instruction. Core 101 may further include hardware for detecting and recovering from a mispredicted load instruction execution. In some embodiments, core 101 may be included in a processor along with L1 cache 103, as indicated by the dashed line in FIG. 1.

L1 cache 103 may reside within core 101 or may reside between core 101 and L2 cache 110. In various embodiments, instructions and/or data may be cached within L1 cache 103 for use by core 101. L1 cache 103 may include separate memory arrays for caching instructions versus data. In some embodiments, cache 103 may be implemented using set-associative or direct-mapped techniques. L1 cache 103 may be a first memory that core 101 accesses in response to a memory request. An L1 cache "hit" occurs when data for a given memory address is determined to be stored in L1 cache 103. Similarly, an L1 cache "miss" occurs when data for a given memory address is determined to be missing from L1 cache 103.

L2 cache 110 may also be configured to cache instructions and/or data for use by core 101. If a given memory address results in an L1 cache miss, then L2 cache 110 may be the next memory to be queried for the data. In some embodiments, L2 cache 110 may include various queues and buffers configured to manage the flow of data to and from L1 cache 103 as well as to and from L3 cache 120.

Like L1 cache 103 and L2 cache 110, L3 cache 120 may be configured to store instructions and/or data for use by core 101. Also similar to L1 cache 103 and L2 cache 110, L3 cache 120 may be implemented using set-associative or direct-mapped techniques. Upon an L2 cache miss, L3 cache 120 may be a next memory accessed for the requested data.

System memory 130 may correspond to one or more types of memory for storing programs and data. System memory 130 may include volatile memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. Non-volatile memory may also be included in system memory 130, such as, for example, a hard-disc drive (HDD), a solid state drive (SSD), an optical disc storage (e.g., DVD-ROM or CD-ROM), or combination thereof. In some embodiments, system memory 130 may correspond to one or more memory controllers used to interface with the above types of memories. Upon an L3 cache miss, system memory 130 may be next memory accessed to locate the requested data.

It is noted that FIG. 1 is merely an example of a system including a core and memories. In other embodiments, system 100 may include multiple cores as well as additional functional blocks, such as, for example, network and/or peripheral interfaces. In various embodiments, the organization of FIG. 1 may represent a logical organization rather than a physical organization, and other components may also be employed.

Figure 2:
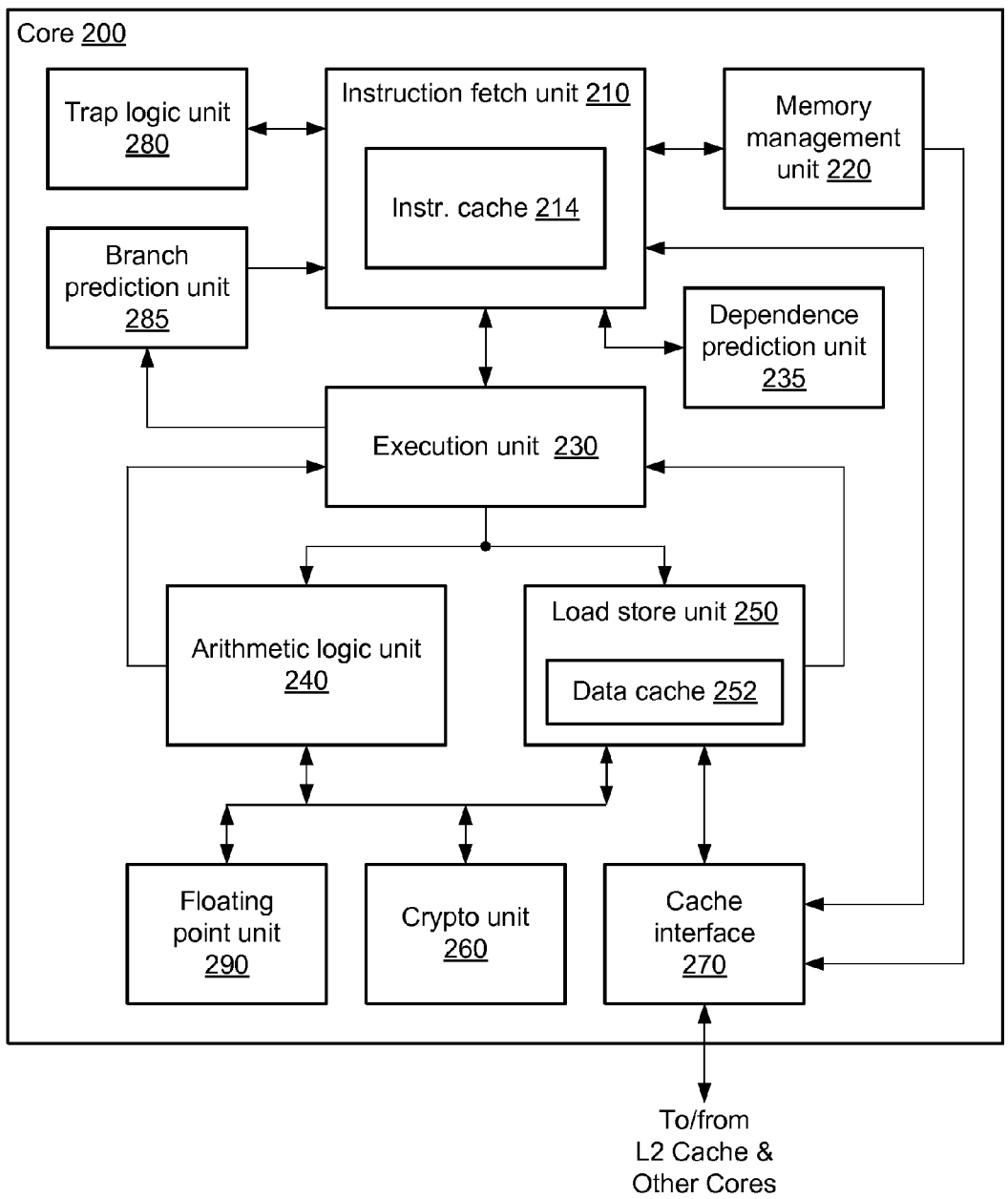
FIG. 2 shows a block diagram illustrating an embodiment of a processor core.

Turning to FIG. 2, an embodiment of a core is illustrated. Core 200 may correspond to core 101 in FIG. 1. In the illustrated embodiment, core 200 includes instruction fetch unit (IFU) 210, coupled to memory management unit (MMU) 220, trap logic unit (TLU) 280, branch prediction unit (BPU) 285, cache interface 270, and instruction scheduling unit (ISU) 216. ISU 216 is coupled to dependence prediction unit 235 and execution unit 230. Execution unit 230 is coupled to arithmetic logic unit (ALU) 240, and load store unit (LSU) 250. ASU 240 and LSU 250 are also coupled to send data back to execution unit 230. Both ALU 240 and LSU 250 are coupled to cryptographic processing (crypto) unit 260 and floating point unit (FPU) 290. IFU 210, MMU 220, and LSU 250 are coupled to cache interface 270.

Instruction fetch unit (IFU) 210 may be configured to retrieve instructions for execution in core 200. In the illustrated embodiment, IFU 210 is configured to perform various operations relating to the fetching of instructions from cache or memory, and the decoding of instructions prior to the instructions being issued for execution. Instruction fetch unit 210 includes instruction cache 214, which may correspond to at least a portion of L1 cache 103. In one embodiment, IFU 210 includes logic to maintain fetch addresses (e.g., derived from program counters) corresponding to each thread being executed by core 200, and to coordinate the retrieval of instructions from instruction cache 214 according to those fetch addresses. In one embodiment, IFU 210 is configured to maintain a pool of fetched, ready-for-issue instructions drawn from among each of the threads being executed by core 200. For example, IFU 210 may implement a respective instruction buffer corresponding to each thread in which several recently-fetched instructions from the corresponding thread may be stored.

Instruction scheduling unit (ISU) 216 may be configured to retrieve instructions for execution in core 200. In the illustrated embodiment, ISU 216 is configured to select instructions for various threads from instruction cache 214 for execution. In some embodiments, ISU 216 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups). In some embodiments, ISU 216 may be configured to further prepare instructions for execution, for example by detecting scheduling hazards, arbitrating for access to contended resources, or the like. Moreover, in the present embodiment, ISU 216 supports speculative issuing of instructions, i.e., instructions from a given thread may be speculatively issued by ISU 216 for execution depending on, e.g., a history of code execution by core 200. For example, a load instruction may be speculatively issued by ISU 216 ahead of one or more store instructions that were received previous to receiving the load instruction. ISU 216 may use historical code execution to decide whether or not to issue the load instruction.

Instruction and data memory accesses may involve translating virtual addresses to physical addresses. A translation of mappings may be stored in an instruction translation lookaside buffer (ITLB) or a data translation lookaside buffer (DTLB) for rapid translation of virtual addresses during lookup of instruction cache 214 or data cache 252. In the event no translation for a given virtual address is found in the appropriate TLB, memory management unit 220 may be configured to provide a translation. In one embodiment, MMU 220 may be configured to manage one or more translation tables stored in system memory and to traverse such tables in response to a request for an address translation, such as from an ITLB or DTLB miss. In some embodiments, if MMU 220 is unable to derive a valid address translation, for example if one of the memory pages including a page table is not resident in physical memory (i.e., a page miss), MMU 220 may be configured to generate a trap to allow a memory management software routine to handle the translation.

In the illustrated embodiment, dependence prediction unit 235 includes logic and data tables for predicting if a load instruction may be safely issued before previously received store instructions. Dependence prediction unit 235 tracks speculatively issued load instructions and detects if older store instructions that are issued after the load instructions access the same memory addresses. Predictions are updated for load instructions stored in instruction cache 214 if a misprediction is detected. Dependence prediction unit 235 also signals trap logic unit 280 if a misprediction is detected, thereby invalidating the load instruction that read incorrect data. More details regarding dependence prediction unit 235 will be provided below.

Branch prediction unit (BPU) 285 may include logic to predict branch outcomes and/or fetch target addresses. BPU 285 may use a Branch History Table (BHT) to track a number of times an instruction branch is taken versus how often the instruction branch is not taken. BPU 285 may also track patterns of taking or not taking a particular branch. Using the data collected in the BHT, BPU 285 may populate a Branch Target Buffer (BTB) with predictions of branches to be taken or not taken.

Execution unit 230 may be configured to process and provide results for certain types of instructions issued from ISU 216. In one embodiment, execution unit 230 may be configured to execute certain integer-type instructions defined in the implemented ISA, such as arithmetic, logical, and shift instructions. It is contemplated that in some embodiments, core 200 may include more than one execution unit 230, and each of the execution units may or may not be symmetric in functionality. Each execution unit 230 may be capable of processing a given software thread. In the illustrated embodiment, instructions destined for ALU 240 or LSU 250 pass through execution unit 230. However, in alternative embodiments it is contemplated that such instructions may be issued directly from ISU 216 to their respective units without passing through execution unit 230.

Arithmetic logic unit (ALU) 240 may be configured to execute and provide results for certain arithmetic instructions defined in the implemented ISA. For example, in one embodiment, ALU 240 implements integer arithmetic instructions, such as add, subtract, multiply, divide, and population count instructions. In one embodiment, ALU 240 implements separate execution pipelines for integer add/multiply, divide, and Boolean operations, while in other embodiments the instructions implemented by ALU 240 may be differently partitioned.

In the illustrated embodiment, floating point unit 290 is implemented separately from ALU 240 to process floating-point operations while ALU 240 handles integer and Boolean operations. FPU 290 implements single-precision and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. In other embodiments, ALU 240 and FPU 290 may be implemented as a single logic block.

Load store unit 250 may be configured to process data memory references, such as integer and floating-point load and store instructions as well as memory requests that may originate from other blocks within core 200, such as crypto processing unit 260, for example. LSU 250 includes a data cache 252 as well as logic configured to detect cache misses and to responsively request data from an L2 cache via cache interface 270. Data cache 252 may correspond to at least a portion of L1 cache 103. In one embodiment, data cache 252 is configured as a write-through cache in which all stores are written to L2 cache regardless of whether they hit in data cache 252; in some such embodiments, stores that miss in data cache 252 cause an entry corresponding to the store data to be allocated within data cache 252. In other embodiments, data cache 252 is implemented as a write-back cache. Additionally, in some embodiments LSU 250 includes logic configured to translate virtual data addresses generated by execution unit 230 to physical addresses, such as a Data Translation Lookaside Buffer (DTLB). In some such embodiments, virtual addresses are translated into real addresses prior to translation to physical addresses. As used and described herein, a real address corresponds to a location in memory from the perspective of application or other software being executed in core 200.

Cryptographic processing unit 260 may be configured to implement one or more specific data processing algorithms in hardware. For example, crypto unit 260 may include logic configured to support encryption/decryption algorithms such as Advanced Encryption Standard (AES), Data Encryption Standard/Triple Data Encryption Standard (DES/3DES), or Rivest Cipher 4 (RC4). Crypto unit 260 may also include logic to implement hash or checksum algorithms such as Secure Hash Algorithm (SHA-1, SHA-256), Message Digest 5 (MD5), or Cyclic Redundancy Checksum (CRC). Crypto processing unit 260 may also be configured to implement modular arithmetic such as modular multiplication, reduction and exponentiation. In one embodiment, crypto unit 260 is configured to utilize the arithmetic functions included in ALU 240. In various embodiments, crypto unit 260 may implement several of the aforementioned algorithms as well as other algorithms not specifically described.

A number of functional units in the illustrated embodiment of core 200 may be configured to generate memory or I/O requests external to core 200. For example, IFU 210 or LSU 250 may generate access requests to an L2 cache 110 in FIG. 1 in response to their respective cache misses. In the illustrated embodiment, cache interface 270 is configured to provide a centralized interface to the port of an L2 cache 110 on behalf of the various functional units that may generate memory accesses. In one embodiment, cache interface 270 is also configured to receive data returned via an L2 cache 110, and to direct such data to the appropriate functional unit (e.g., data cache 252 for a data cache fill due to miss). Cache interface 270 may, in some embodiments, be coupled to other cores in a multicore processor.

During the course of operation of some embodiments of core 200, exceptional events may occur. For example, an instruction from a given thread that is picked for execution by ISU 216 may not be a valid instruction for the ISA implemented by core 200 (e.g., the instruction may have an illegal opcode), a floating-point instruction may produce a result that requires further processing in software, a hardware error (such as uncorrectable data corruption in a cache or register file) may be detected, or any of numerous other possible architecturally-defined or implementation-specific exceptional events may occur. In one embodiment, trap logic unit 280 is configured to manage the handling of such events. For example, TLU 280 may be configured to receive notification of an exceptional event occurring during execution of a particular thread, and to cause execution control of that thread to vector to a privileged mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 280 flushes all instructions from the trapping thread from any stage of processing within core 200, without disrupting the execution of other, non-trapping threads. In some embodiments, when a specific instruction from a given thread causes a trap (as opposed to a trap-causing condition independent of instruction execution, such as a hardware interrupt request), TLU 280 implements such traps as precise traps. That is, TLU 280 ensures that all instructions from the given thread that occur before the trapping instruction (in program order) commit and update architectural state, while no instructions from the given thread that occur after the trapping instruction (in program order) commit or update architectural state.

It is noted that, as used herein, "committing" or to "commit" an instruction refers to processing of an instruction after the instruction has been executed, completed, and results of the instruction have been saved in an appropriate memory and available for use by a subsequent instruction. In some embodiments, to "commit" an instruction is the same as to "retire" an instruction. In the embodiments presented herein, an instruction is not committed until all previously received instructions have been committed. Accordingly, an instruction issued out-of-order may have to wait until the previous instructions are committed before being committed itself.

The embodiment of the core illustrated in FIG. 2 is one of multiple contemplated examples. Other embodiments of a core may include a different number and configuration of components. For example, ALU 240 and FPU 290 may be implemented as a single functional block rather than two separate units.

Figure 3:
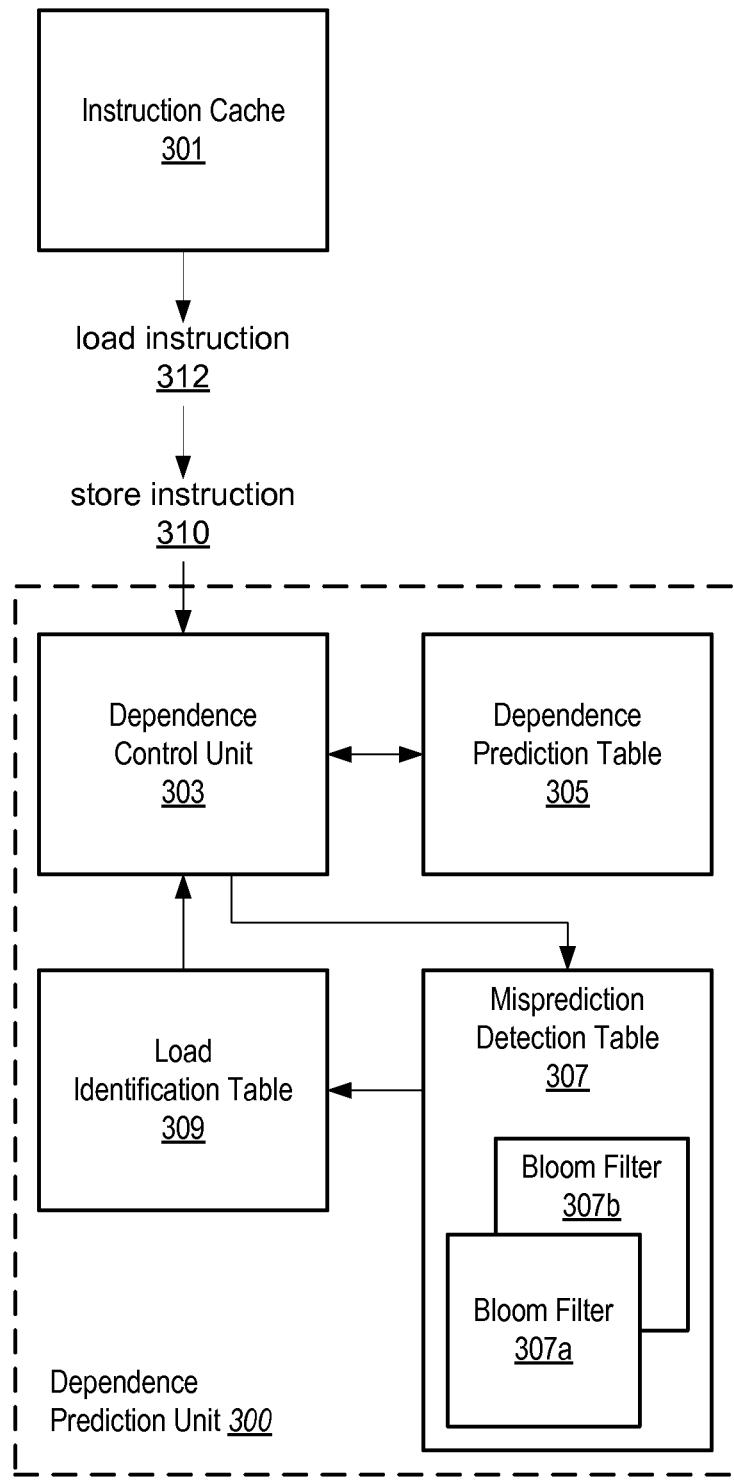
FIG. 3 shows a block diagram of an embodiment of a dependence prediction unit.

Moving to FIG. 3, an illustration of a block diagram of an embodiment of a dependence prediction unit is shown. Dependence prediction unit 300 may correspond to dependence prediction unit 235 in FIG. 2. In the present embodiment, dependence prediction unit 300 includes dependence control unit 303, dependence prediction table 305, misprediction detection table 307, and load identification table 309. Instruction cache 301 is coupled to dependence prediction unit 300, and may correspond to instruction cache 214 in FIG. 2.

In the illustrated embodiment, dependence control unit 303 retrieves instructions from instruction cache 301. Dependence control unit 303 may retrieve store instruction 310, followed by load instruction 312. One or more other instructions may be retrieved between store instruction 310 and load instruction 312. Referring to FIG. 2, in some embodiments, instruction fetch unit 210 may not issue store instruction 310 to execution unit 230 for any of various reasons, such as, for example, the memory targeted by store instruction 310 is currently busy and cannot receive instructions.

Dependence control unit 303 determines if load instruction 312 may be speculatively issued before store instruction 310 issues. Dependence prediction table 305 is used to by dependence control unit 303 to make the determination. Dependence control unit 303 reads an entry in dependence prediction table 305 corresponding to a location of load instruction 312 within instruction cache 301. Depending on a value in the corresponding entry, dependence control unit 303 predicts if load instruction 312 is safe to issue ahead of store instruction 310.

Upon executing load instruction 312, dependence control unit 303 increments one or more entries in misprediction detection table 307. In the illustrated embodiment, misprediction detection table 307 includes two Bloom filters, 307a and 307b in which each Bloom filter 307a and 307b includes a plurality of entries. Dependence control unit 303 selects an entry from each Bloom filter 307a and 307b based on an address value determined from an operand included in load instruction 312. In some embodiments, a virtual address may be used, while in other embodiments, a physical address may be used. Each entry is selected using a different combination of bits comprising the address value. A more detailed description of the entry selection process is provided below.

At some time after load instruction 312 issues and executes, store instruction 310 issues. During execution of store instruction 310, a value of an operand address is used to select two respective entries in Bloom filters 307a and 307b using the same combinations of bits as were used during execution of load instruction 312. If load instruction 312 and store instruction 310 access a same address, then the same entries are selected from Bloom filters 307a and 307b, and the entries respective values will each be greater than zero. If the values of both entries are greater than zero, then dependence control unit 303 sets a flag in an entry of load identification table 309. The entry of load identification table 309 is selected dependent upon indexes of the two entries of Bloom filters 307a and 307b.

Load instruction 312 commits after all previously received instructions have committed. Store instruction 310, therefore, commits before load instruction 312. During the commit process for load instruction 312, dependence control unit 303 selects and reads an entry in load identification table 309. The same method for selecting the entry of load identification table as described above for store instruction 310 is used here again. If load instruction 312 and store instruction 310 accessed the same address, then the selected entry is the same as the entry previously set during execution of store instruction 310. If this entry is set, then load instruction 312 is assumed to have loaded invalid data since the store instruction may have modified the value of the data at the common address. Dependence control unit 303 sets a trap notification for a trap logic unit such as TLU 280 in FIG. 2. Load instruction 312 is invalidated along with any subsequent commands from the same thread.

As used herein, a "Bloom filter" refers to one or more data tables in which an input value is used to create one or more indices to access corresponding entries in the data tables. Each entry of each table may include a single bit such that a clear bit indicates that the respective input value is definitely not included as a member of a group while a set bit indicates that the respective input value may be a member of a group. In other embodiments, each entry of each table may include a multiple bits and each time an entry is accessed, a value of the accessed entry is incremented, thereby determining a number of possible members of the group. In the disclosed embodiments, a group consists of speculatively issued load instructions accessing a particular memory address, where the address of the memory is used as the input value to the Bloom filters. By using Bloom filters, a determination may be made if a speculatively issued load instruction definitely does not access a memory location of a previously received store instruction (i.e., no false negative determinations occur) or that the speculatively issued load instruction possibly does access the memory location of the previously received store instruction (i.e., a false positive determination may occur). Since letting a load instruction commit with invalid data might cause a serious error in program execution, a false negative determination should be avoided. Conversely, while a false positive determination may result in extra processing cycles to repeat the load instruction after the associated store instruction commits, the extra cycles may not cause errors in program execution, and a false positive determination may, therefore, be tolerable.

It is noted that FIG. 3 is merely an example. In other embodiments, additional functional blocks may be included, additional Bloom filters in the misprediction detection table 307. Some actions described as being performed by dependence control unit 303 may be performed by other blocks in a core, such as, for example, execution unit 230 or instruction fetch unit 210.

Figure 4:
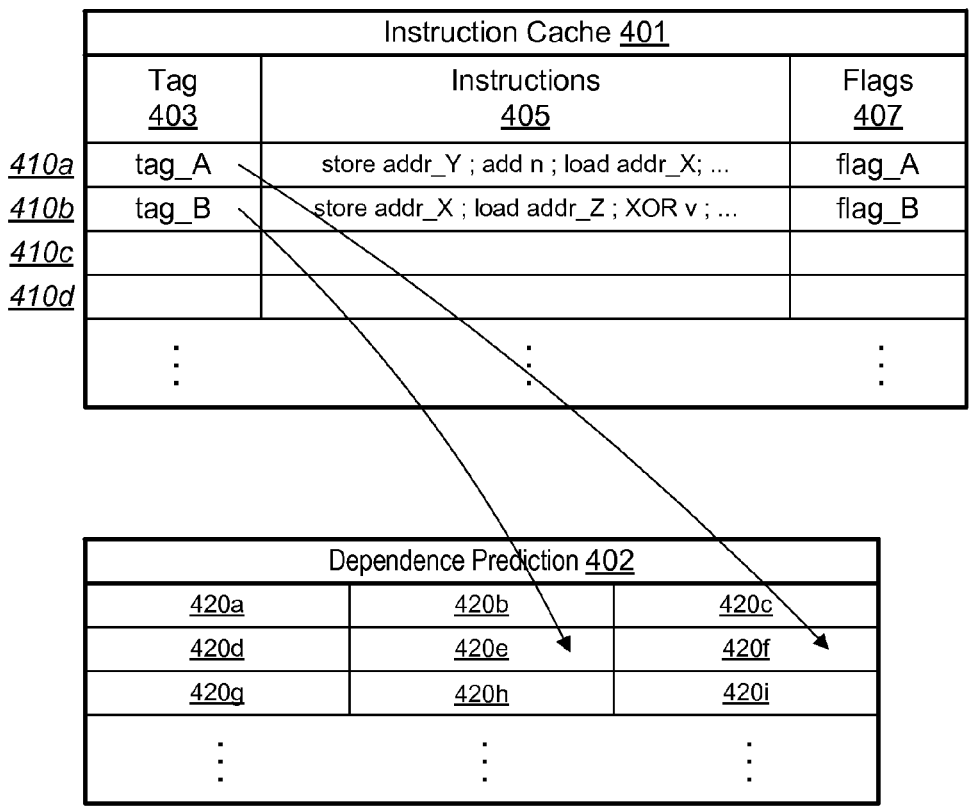
FIG. 4 illustrates embodiments of an instruction cache and a dependence prediction table.

Turning now to FIG. 4, embodiments of an instruction cache and a dependence prediction table are illustrated. Instruction cache 401 may correspond to instruction cache 301 as illustrated in FIG. 3, and includes multiple cache lines 410, including illustrated cache lines 410a-410d. Dependence prediction table 402 may correspond to dependence prediction table 305 in FIG. 3, and include multiple entries 420, including illustrated entries 420a-420i.

In the illustrated embodiment, each cache line 410 in instruction cache 401 includes a respective column for each of cache tags 403, instructions 405, and flags 407. Cache tags 403 include a value corresponding to an address range that includes the addresses for the instructions stored in the respective cache line 410. Instructions 405 include one or more instructions stored in the respective cache line 410. Each cache line 410 may store up to a predetermined number of fetched instructions. For example, a given instruction cache may include 32 cache lines with each cache line capable of storing 64 instructions. In such an embodiment, a value of cache tag 403 would correspond to an address range that includes 64 consecutive instructions. Each cache line 410 also includes a respective entry for flags 407. Flags 407 include flags for determining a status of the respective cache line 410, including at least one bit to indicate if instructions stored in the respective cache line 410 are valid or invalid.

Dependence prediction table 402, in the present embodiment, includes a respective entry 420 for each cache line 410 in instruction cache 401. Each entry 420 includes one bit corresponding to each instruction capable of being stored in a cache line 410. Returning to the previous example, if a cache line 410 can store 64 instructions, then each entry 420 includes 64 bits, one bit corresponding to each instruction. In another embodiment, each entry 420 may include a single bit that corresponds to all instructions in a respective cache line 410, regardless of how many instructions can be stored. In various other embodiments, each entry 420 may include a plurality of bits, with each bit corresponding to two or more instructions in the respective cache line 410. In the 64 instruction cache line example, each entry 420 may, for example, include 8 bits, each bit corresponding to 8 instructions, or 4 bits with each bit corresponding to 16 instructions.

A given entry 420 is selected based upon a value of cache tag 403 corresponding to a selected cache line 410. For example, if the "load addr_Z" instruction in cache line 410b is being considered for a speculative issue before the preceding "store addr_X" instruction, then the corresponding "tag_B" cache tag 403 is used to index into dependence prediction table 402, resulting in entry 420e being selected. If the bit corresponding to the "load addr_Z" instruction is set (or clear in other embodiments), then "load addr_Z" may be allowed to speculatively issue. Similarly, if the "load addr_X" instruction in cache line 410a is being considered for a speculative issue, then the corresponding "tag_A" will index to entry 420f.

When a given cache line 410 is allocated to a respective address range, the corresponding entry 420 is initialized to set all bits of the entry. The default state of an initialized entry 420 is, therefore, to allow corresponding load instructions in the respective cache line 410 to speculatively issue. As will be explained in more detail below, if a misprediction occurs, and a given load instruction in the respective cache line 410 should not have speculatively issued, then the corresponding bit in the initialized entry 420 will be cleared to prevent further speculative issues of the given load instruction.

It is noted that the tables of FIG. 4 are merely examples to demonstrate operation of an embodiment of a dependence prediction unit. In other embodiments, instruction cache 401 may include additional columns per cache line 410. The illustrated tables are not intended to imply a physical arrangement of data, merely a logical representation.

Figure 5:
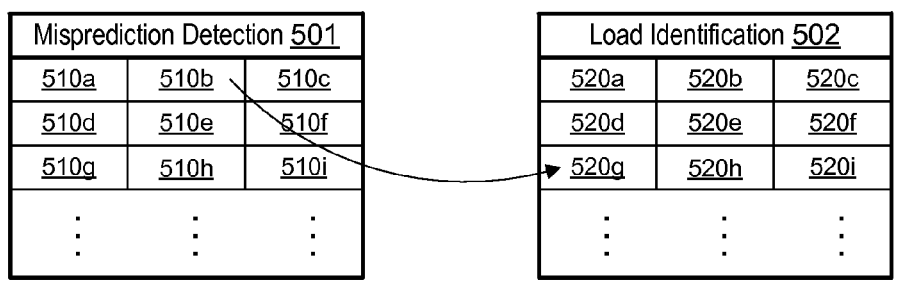
FIG. 5 shows embodiments of a misprediction detection table and a load identification table.

Moving now to FIG. 5, embodiments of a misprediction detection table and a load identification table are shown. Misprediction detection table 501 may correspond to misprediction detection table 307 in FIG. 3, while load identification table 502 may correspond to load identification table 309.

In the present embodiment, misprediction detection table 501 includes a plurality of MD entries 510, including illustrated MD entries 510a-510i. Each MD entry 510 includes one or more bits. When a speculatively issued load instruction executes, a respective MD entry 510 is selected and the entry's value is incremented. Selection of the respective MD entry 510 is based on the operand address of the issued load instruction. When a given store instruction executes, a corresponding MD entry 510 is selected, based on the operand address of the given store instruction. If a value of the corresponding MD entry 510 is zero, then normal instruction execution continues. If, however, the value of the corresponding MD entry 510 is non-zero, then a speculatively issued load instruction may have read data from the same address as the given store instruction, and therefore, the issued load instruction may have read invalid data. In some embodiments, when a given MD entry 510 reaches a predetermined value, such as, e.g., a maximum value in which all bits are equal to one, no further load instructions with operand addresses corresponding to the given MD entry 510 will be allowed to be issued. In such embodiments, the number of bits included in each MD entry 510 may be chosen dependent upon a desired predetermined value.

In response to a determination that the issued load instruction may have read invalid data, an entry in load identification table 502 is set. Load identification table 502 is used to identify the issued load instruction that may have read the invalid data. Load identification table includes a plurality of ID entries 520, including illustrated ID entries 520a-520i. The number of ID entries 520 may or may not be equal to the number of MD entries 510. Each ID entry 520 includes at least one bit, and a value of each ID entry 520 indicates if a load instruction may have read data from a respective address. When a non-zero value of a given MD entry 510 is read in response to execution of a given store instruction, indicating that an issued load instruction may have read invalid data, a first ID entry 520 is selected. The first ID entry 520 selection is based upon an index of the selected MD entry 510, and is, therefore, also dependent upon the operand address of the given store instruction. In the illustrated embodiment, MD entry 510b corresponds to ID entry 520g. If load identification table 502 has fewer entries than misprediction detection table 501, then more than one MD entry 520 may correspond to ID entry 520g.

When the given store instruction commits, the first ID entry 520 is assigned a value indicating that invalid data has possibly been read. Afterwards, when the speculatively issued load instruction commits, a second ID entry 520 is selected dependent upon the operand address of the load instruction. If the load instruction and the given store instruction have the same operand address, then the first and second ID entries 520 will the same ID entry 520. The assigned value is read, indicating that the speculatively issued load instruction may have read invalid data. As a result, the load instruction is not committed, but instead invalidated. A value in a corresponding entry 420 in dependence prediction table 402 in FIG. 4 is cleared to prevent the corresponding load instruction from speculatively issuing again. The load instruction is re-fetched and re-issued.

It is noted that the speculatively issued load instruction is described above as maybe having read invalid data. This distinction is due to misprediction detection table 501 and load identification table 502 each having fewer entries than a given system (such as, e.g., system 100 in FIG. 1) has memory locations from which to load and store data. A given computing system may support gigabytes, terabytes, or even more memory addresses. To keep the size of the misprediction table 501 and load identification table 502 to suitable sizes to meet cost and performance targets, their sizes may be selected to support fewer respective entries. Selection of a given MD entry 510 or ID entry 520 is dependent upon the address of the load or store instruction's operand. The selection is made, in various embodiments, by using a portion of the address and/or hashing data bits of the address to create a respective index into each table. These indices each correspond to a single MD entry 510 and single ID entry 520. The method of generating the indices results in an address of each possible memory location corresponding to a single MD entry 510 and a single ID entry 520. Each MD entry 510 and ID entry 520, however, may correspond to multiple memory locations. A given load instruction, therefore, may have a different operand address than a given store instruction yet both operand addresses may correspond to a same MD entry 510, and therefore to a same ID entry 520. Consequently, a false positive misprediction may occur if the given load instruction is speculatively issued and executed before the given store instruction is executed.

It is also noted that the tables of FIG. 5 are examples for demonstration purposes. In other embodiments, organization of each table may differ from the illustrated embodiment. Although each table is shown as a single table, either table may be composed of multiple tables with different indexing algorithms, as will be shown below.

Figure 6:
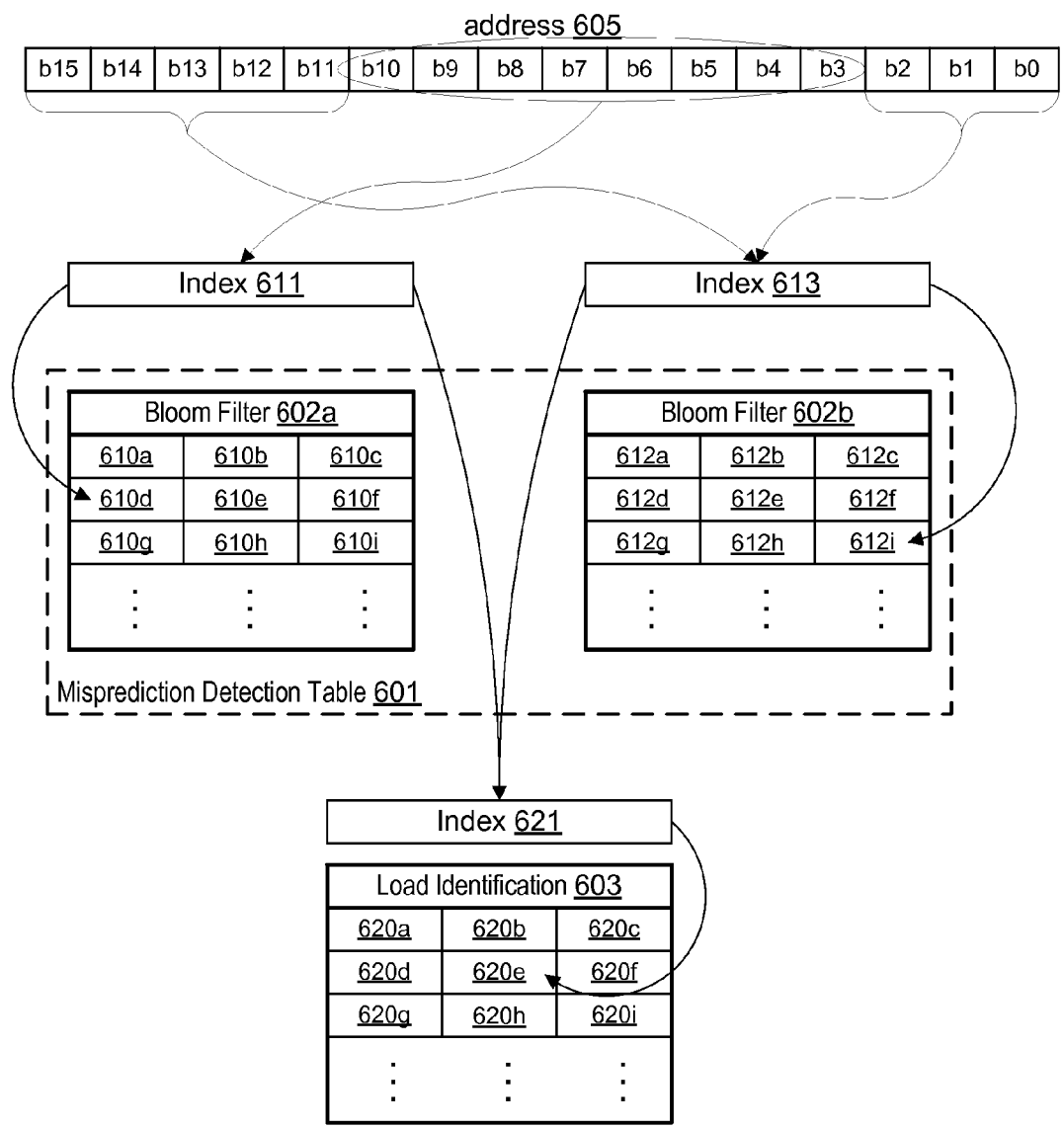
FIG. 6 is an illustration showing a relationship between an address and index values in an embodiment of misprediction detection and load identification tables.

Turning to FIG. 6, a relationship between an address and index values in an embodiment of a misprediction detection table and a load identification table is illustrated. FIG. 6 includes misprediction detection table 601 and load identification table 603. Misprediction detection table 601 includes Bloom filters 602a and 602b. FIG. 6 also includes address 605, index 611, index 613, and index 621. In the present embodiment, misprediction detection table 601 corresponds to misprediction table 307 in FIG. 3, while load identification table 603 corresponds to load identification table 309. Accordingly, Bloom filter 601a corresponds to Bloom filter 307a and Bloom filter 601b corresponds to Bloom filter 307b.

In the present embodiment, address 605 corresponds to an operand address of a store or load instruction. Address 605 includes 16 address bits, although, in other embodiments, any suitable number of address bits may be included. When misprediction detection table 601 is accessed in response to an execution of either a store or speculatively issued load instruction, control logic, such as dependence control unit 303 in FIG. 3, for example, determines indices for accessing misprediction detection table 601. More specifically, index 611 is generated for accessing Bloom filter 602a, while index 613 is generated to access Bloom filter 602b. In the illustrated example, index 611 is generated using address bits b10-b3 of address 605, while index 613 is generated using remaining address bits b15-b11 and b2-b0. In other embodiments, any suitable combination of address bits may be used for generating each index. In various embodiments, the generation of index 611 and index 613 may include a hash function and/or reordering of the respective address bits, such that a small difference in the address bit values may result in a larger difference in the resulting index values.

It is noted that a "hash function" or "hashing" a value, as used herein, refers to an algorithm wherein bits of an input value are arithmetically and/or logically combined to produce a result with a fixed number of bits. For example, in the illustrated embodiment, Bloom filters 602a and 602b each include 256 BF entries 610 and BF entries 612. A hash function for generating index 611 or index 613 will generate an eight bit index value to access each entry in a respective Bloom filter.

In the present embodiment, the number of entries in each of Bloom filters 602a and 602b is less than the number of addressable memory locations. As stated, each Bloom filter 602 includes 256 entries while the 16 bit address 605 can address 65,536 memory locations. Each entry of each Bloom filter 602, therefore, may correspond to 256 of the 65,536 possible addresses. As previously disclosed, having multiple physical addresses correspond to one entry in a misprediction detection table may result in false positive indications of a misprediction when a load instruction and a store instruction have difference operand addresses that map to a same entry. Using two Bloom filters rather than one may reduce the number of false positive occurrences. By using different algorithms to generate index 611 and index 613, suitable algorithms may be chosen such that of the 256 values of address 605 that correspond to a given value of index 611, fewer than 256 of those values result in a same value of index 613, thereby reducing the potential number of false positives.

When a speculatively issued load instruction (e.g., load instruction 312) executes, index 611 and index 613 are generated dependent upon the load operand address. Each index references a respective entry, for example, index 611 may reference BF entry 610d and index 613 may reference BF entry 612i for a given value of address 605. A value for each of BF entry 610d and BFR entry 612i is incremented. At some time afterwards, before load instruction 312 commits, a store instruction (e.g., store instruction 310) is executed. Values for index 611 and index 613 are again generated using the store operand address. If the store operand address is the same as the load operand address, then BF entry 610d and BF entry 612i are read. Since both entries have been incremented, the values for each of the entries are non-zero, indicating a possible misprediction for load instruction 312.

Continuing the example, as a result of BF entry 610d and BF entry 612i each having non-zero values, index 621 is generated dependent upon the values of index 611 and index 613. In response to store instruction 310 committing, index 621 is used to access ID entry 620e of load identification table 603 and set its value to indicate that load instruction 312 may have read invalid data. In response to load instruction 312 committing at some time after store instruction 310 commits, load identification table 603 is accessed. Index 621 for load instruction 312 is generated based on the previously used index 611 and index 613 associated with load instruction 312. Again, if the store address and load address are the same, then ID entry 620e will be read. The value of ID entry 620e indicates the misprediction and the memory value read during the execution of load instruction 312 is discarded. Load instruction 312 is re-issued to execute again.

It is noted that the tables illustrated in FIG. 6 are an example embodiment. The examples for generating the index values may use different combinations of address bits than those shown in FIG. 6. Although two Bloom filters are shown to comprise misprediction detection table 601, any suitable number of Bloom filters or other form of tables may be used in other embodiments.

Figure 7:
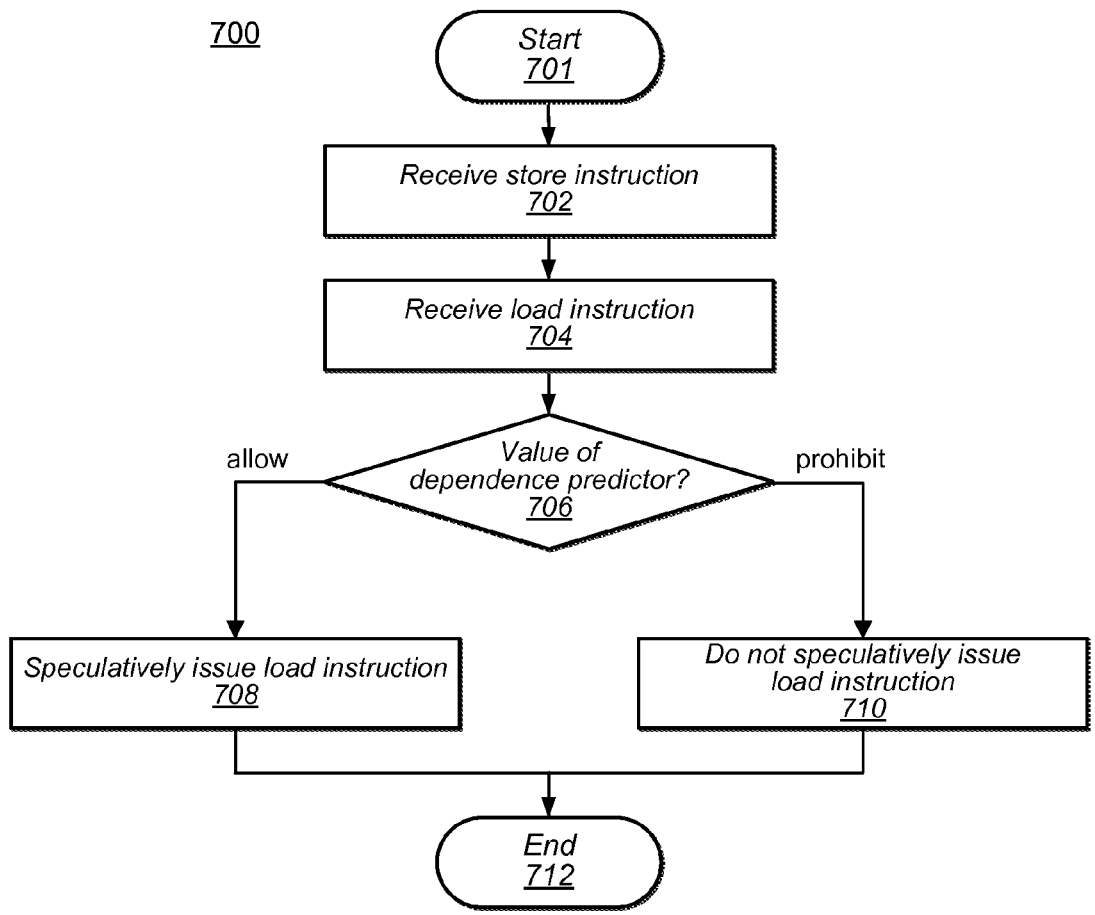
FIG. 7 is a flow diagram illustrating an embodiment of a method for determining a prediction for speculatively issuing a load instruction.

Moving to FIG. 7, a flow diagram illustrating an embodiment of a method for determining a prediction for speculatively issuing a load instruction is shown. The operations of method 700 may be applicable to a dependence prediction unit, such as, for example, dependence prediction unit 300 in FIG. 3. Referring collectively to FIG. 3 and the flowchart of FIG. 7, the illustrated embodiment of the method begins in block 701.

A store instruction is received for operation on a first memory location (block 702). Dependence control unit 303 receives the store instruction from instruction cache 301. The store instruction includes an operand corresponding to a first address for the first memory location. An instruction scheduling unit, such as, for example, ISU 216 in FIG. 2, determines that the store instruction is to be issued later, due to, for example, a lack of available resources to execute the store instruction at the present time.

A load instruction is received for operation on a second memory location (block 704). Dependence control unit 303, again, receives the load instruction from instruction cache 301 and the load instruction includes an operand corresponding to a second address for the second memory location. At the present time, neither the first or second address values have been decoded and are therefore not known if they correspond to the same physical memory location.

Further operations of the method may depend on a value of an entry in dependence prediction table 305 (block 706). Dependence control unit 303 uses a value of a cache tag associated with a cache line that includes the load instruction to select and read an entry in dependence prediction table 305. If a value of the selected entry indicates that the load instruction is allowed to speculatively issue, then the method moves to block 708 to perform the issue. Otherwise, if the value of the selected entry indicates that the load instruction is not allowed to speculatively issue, then the method moves to block 710 to prevent the issue.

If the load instruction is allowed to speculatively issue, then ISU 216 issues the load instruction (block 708). Upon determining that the load instruction is allowed to speculatively issue, dependence control unit 303 asserts an indication allowing ISU 216 to issue the load instruction. The load instruction, however, will not be committed until all previously received store commands have committed. The method then ends in block 712.

If the load instruction is not allowed to speculatively issue, then ISU 216 prevents issuance of the load instruction (block 710). Upon determining that the load instruction is not allowed to speculatively issue, dependence control unit 303 de-asserts an indication preventing ISU 216 from issuing the load instruction. ISU 216 will issue the load instruction only after previously received store instructions have issued. The method then ends in block 712.

It is noted that the method illustrated in FIG. 7 is an example for demonstrating the disclosed concepts. Operations are illustrated as occurring in a sequential fashion. In other embodiments, however, some of the operations may be performed in parallel or in a different sequence. Additional operations may be included in some embodiments.

Figure 8:
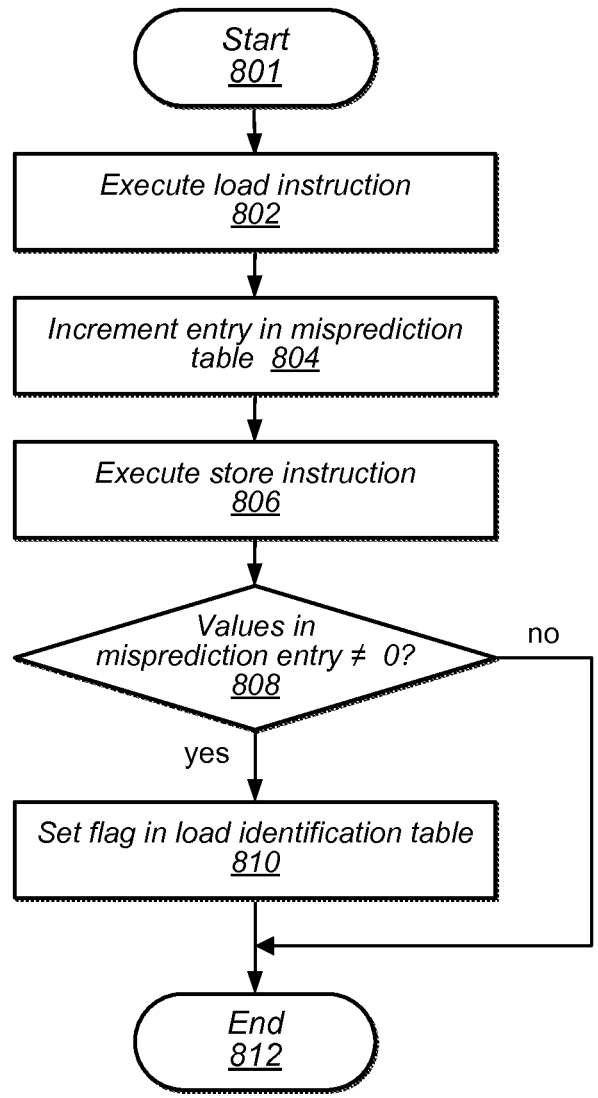
FIG. 8 shows a flow diagram of an embodiment of a method for determining if a misprediction occurred for a speculatively issued load instruction.

Turning now to FIG. 8, a flow diagram for determining if a misprediction occurred for a speculatively issued load instruction is illustrated. In the present embodiment, the operations of method 800 are applicable to dependence prediction unit 300 in FIG. 3. Referring collectively to FIG. 3 and the flowchart of FIG. 8, the illustrated embodiment of the method begins in block 801 after a load instruction has been speculatively issued ahead of a previously received store instruction.

The speculatively issued load instruction is executed (block 802). The load instruction is speculatively issued by an instruction scheduling unit, such as, for example, ISU 216 in FIG. 2. Upon issuance, an execution unit, such as, e.g., execution unit 230 in FIG. 2, executes the instruction. Execution of the load instruction may include decoding an operand of the instruction to determine a physical address of the memory location to read. The memory location may correspond to data in a cache such as, L1 cache 103, L2 cache 110, or L3 cache 120 in FIG. 1, in which case the data is read from the appropriate cache. If the data has not been cached, then the data is fetched from a memory, such as system memory 130. When execution of the load instruction is complete, data associated with the load instruction is buffered until the instruction is committed. The load instruction, however, is not committed until previously received store instructions are committed.

In response to executing the load instruction, at least one entry in misprediction detection table 307 is incremented (block 804). In the present embodiment, dependence control unit 303 uses the operand address of the load instruction to determine two index values, one to select an entry in Bloom filter 307a and the other to select an entry in Bloom filter 307b. Values in each entry are incremented to indicate that a speculatively issued load instruction has read data from a memory address associated with both determined indices. The respective values of the indices are determined using different algorithms to hash at least respective portions of the memory address. The algorithms are defined such that different address values are unlikely to generate the same two values for the indices.

A store instruction that was received prior to the load instruction is executed (block 806). ISU 216 may have delayed issuance of the store instruction due to a lack of available resources to execute the store instruction. Upon resources becoming available, ISU 216 issues the store instruction for execution. An operand of the store instruction may be decoded to determine a physical address in memory for storing associated data. The associated data is then written to the physical address.

Further operations of the method may depend on a value of a respective entry in Bloom Filter 307a and Bloom filter 307b (block 808). In response to executing the store instruction, dependence control unit 303 uses the operand address of the store instruction to determine two new index values for selecting a respective entry in each of Bloom filter 307a and Bloom filter 307b. A value in each entry is read and a determination is made if both values are non-zero. If the load instruction address is the same as the store instruction address, then the same index values are determined and both entry values will be non-zero. If both entry values are non zero, then the method moves to block 810 to set an indication. In some embodiments, a status bit associated with the store instruction may be set. Otherwise, if either entry value is zero, then the method ends in block 812.

A flag is set in load identification table 309 in response to both entry values being non-zero (block 810). Dependence control unit 303 uses the two index values determined during the execution of the store instruction to determine a third index value for selecting an entry in load identification table 309. In some embodiments, dependence control unit 303 may generate the third index value in response to the status bit associated with the store instruction being set. The selected entry includes one or more bits into which a value is stored to indicate that a load instruction was possibly issued speculatively based on a misprediction. The method ends in block 812.

It is noted that the method illustrated in FIG. 8 is merely an example. Although operations are illustrated as occurring in a sequential fashion, in other embodiments, some operations may be performed in a different sequence or in parallel. Additional operations may be included in some embodiments.

Figure 9:
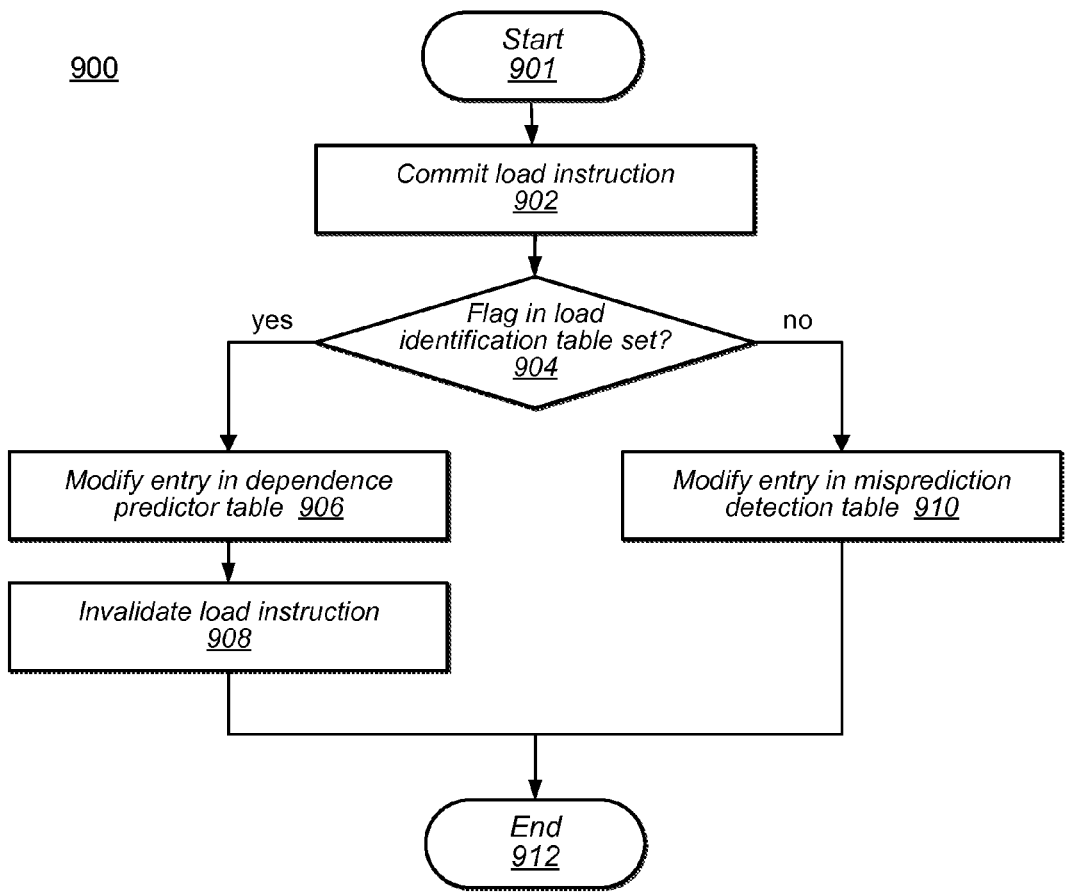
FIG. 9 illustrates a flow diagram of an embodiment of a method for committing a speculatively issued load instruction.

Moving now to FIG. 9, a flow diagram for an embodiment of a method for committing a speculatively issued load instruction is shown. In the present embodiment, the operations of method 900 are applicable to dependence prediction unit 300 in FIG. 3. Referring collectively to FIG. 3 and the flowchart of FIG. 9, the illustrated embodiment of the method begins in block 901 after a speculatively issued load instruction has been executed and previously received store instructions have been committed.

The speculatively issued load instruction begins a commitment process (block 902). After execution, the speculatively issued load instruction waits until all previously received store instructions have executed and committed. Upon a last of the previously received store instructions committing, the load instruction is permitted to begin the commitment process.

Further operations of the method may depend on a value of a flag in load identification table 309 (block 904). As part of the commitment process, dependency control unit 303 retrieves previously determined index values generated to access Bloom filters 307a and 307b when the load instruction was executing. In other embodiments, these index values may be recalculated rather than retrieved. The retrieved index values are used to generate an index value to access an entry in load identification table 309, and a value is read from the entry. If the value indicates that a possible misprediction resulted in the load instruction issuing before a previously received store instruction, then the method moves to block 906 to begin an invalidation process. Otherwise, if the value indicates that a misprediction related to the issuance of the load instruction did not occur, then the method moves to block 910 to update corresponding entries in misprediction detection table 307.

An entry in dependence predictor table 305 is updated in response to an indication of a possible misprediction (block 906). Dependency control unit 303 updates the entry in dependence predictor table 305 that corresponds to the load instruction. Since this entry held a value that allowed the load instruction to be speculatively issued, the value is modified to prevent the load instruction (or other load instructions associated with this entry) to be speculatively issued again.

The results of the load instruction are invalidated (block 908). Since the load instruction possibly read invalid data, the read data is discarded and the load instruction is marked for re-issue. ISU 216 will schedule the load instruction for re-issue at a suitable time. The method ends in block 908.

In response to an indication that a misprediction related to the issuance of the load instruction did not occur, corresponding entries in misprediction detection table 307 are updated (block 910). Entries in Bloom filters 307a and 307b that were incremented during the execution of the load instruction, as described in regards to block 804 of FIG. 8, are decremented to indicate that the speculative issue of the load instruction resulted in a read of valid data, i.e., no misprediction was detected. Dependency control unit 303 uses the index values for Bloom filters 307a and 307b (as used in block 904) to access the corresponding entries and decrement a value in each entry. The method ends in block 912.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising;
a memory;
an instruction cache including a plurality of cache lines; and
a processor configured to:
retrieve, from a first cache line of the plurality of cache lines, a first instruction to store data in a memory location at an address in the memory;
subsequently retrieve, from a second cache line of the plurality of cache lines, a second instruction to read the memory location at the address in the memory;
execute, based on a value stored in a first entry in a dependence prediction table, the second instruction at a first time, wherein the first entry in the dependence prediction table is selected based on a value included in the second cache line, and wherein entries in the dependence prediction table are used to predict a dependence of respective instructions on previously retrieved instructions;
increment a value stored in a second entry in a misprediction detection table in response to executing the second instruction, wherein the second entry in the misprediction detection table is selected based on the address, and wherein entries in the misprediction detection table are used to detect mispredictions based on the entries in the dependence prediction table;
execute the first instruction at a second time, wherein the second time is later than the first time;
read the value stored in the second entry in the misprediction detection table in response to executing the first instruction; and
invalidate a result of the second instruction based on the value stored in the second entry.

2. The system of claim 1, wherein to invalidate the result of the second instruction the processor is further configured to set a flag in a third entry in a load identification table in response to a determination that the value stored in the second entry in the misprediction detection table is greater than zero.

3. The system of claim 2, wherein the processor is further configured to read the flag in the third entry in the load identification table in response to beginning a commit process for the second instruction at a third time, wherein the third time is later than the second time.

4. The system of claim 3, wherein in response to a determination that the flag in the third entry is set, the processor is further configured to:
modify the value stored in the first entry in the dependence prediction table; and
invalidate the result of the second instruction.

5. The system of claim 1, wherein the misprediction detection table includes at least two bloom filter tables, and wherein to increment the value stored in the second entry in the misprediction detection table, the processor is further configured to increment a value stored in a fourth entry in a fourth table in response to executing the second instruction, wherein the second entry in the misprediction detection table is selected dependent upon a first portion of bits of the address, wherein the fourth entry in the fourth table is selected dependent upon a second portion of bits of the address, and wherein the first portion of bits of the address and the second portion of bits of the address are different.

6. The system of claim 5, wherein the processor is further configured to:
read the value stored in the fourth entry in the fourth table in response to executing the first instruction; and
set a flag in a third entry in a load identification table in response to a determination that both the value stored in the second entry and the value stored in the fourth entry are greater than zero.

7. The system of claim 1, wherein the dependence prediction table includes a plurality of entries and wherein each entry of the plurality of entries corresponds to a respective cache line of the plurality of cache lines.

8. A method comprising:
fetching, from a first cache line of a plurality of cache lines, a first instruction to store data in a memory location at an address in a memory;
subsequently fetching, from a second cache line of the plurality of cache lines, a second instruction to read the memory location at the address in the memory;
executing, based on a value stored in a first entry in a dependence prediction table, the second instruction at a first time, wherein the first entry in the dependence prediction table is selected based on a value included in the second cache line;
incrementing a value stored in a second entry in a misprediction detection table in response to executing the second instruction, wherein the second entry in the misprediction detection table is selected based on the address;
executing the first instruction at a second time, wherein the second time is later than the first time;
reading the value stored in the second entry in the misprediction detection table in response to executing the first instruction; and
invalidating a result of the second instruction based on the value stored in the second entry.

9. The method of claim 8, further comprising setting a flag in a third entry in a load identification table in response to determining that the value stored in the second entry in the misprediction detection table is greater than zero.

10. The method of claim 9, further comprising reading the flag in the third entry in the load identification table in response to beginning a commit process for the second instruction at a third time, wherein the third time is later than the second time.

11. The method of claim 10, further comprising, in response to determining that the flag in the third entry is set:
modifying the value stored in the first entry in the dependence prediction table; and
invalidating the result of the second instruction.

12. The method of claim 8, further comprising incrementing a value stored in a fourth entry in a fourth table in response to executing the second instruction, wherein the second entry in the misprediction detection table is selected dependent upon a first portion of bits of the address, wherein the fourth entry in the fourth table is selected dependent upon a second portion of bits of the address, and wherein the first portion of bits of the address and the second portion of bits of the address are different.

13. The method of claim 12, further comprising:
reading the value stored in the fourth entry in the fourth table in response to executing the first instruction; and
setting a flag in a third entry in a load identification table in response to a determination that both the value stored in the second entry and the value stored in the fourth entry are greater than zero.

14. The method of claim 8, wherein the dependence prediction table includes a plurality of entries and wherein each entry of the plurality of entries corresponds to a respective cache line of the plurality of cache lines.

15. An apparatus, comprising:
an instruction cache including a plurality of cache lines;
an execution unit;
a prediction unit; and
an instruction fetch unit configured to:
fetch, from a first cache line of the plurality of cache lines, a first instruction to store data in a memory location at an address in a memory; and
subsequently fetch, from a second cache line of the plurality of cache lines, a second instruction to read the memory location at the address in the memory;
wherein the execution unit is configured to execute, based on a value stored in a first entry in a dependence prediction table, the second instruction at a first time, wherein the first entry in the dependence prediction table is selected based on a value included in the second cache line;
wherein the prediction unit is configured to increment a value stored in a second entry in a misprediction detection table in response to the execution of the second instruction, wherein the second entry in the misprediction detection table is selected based on the address;
wherein the execution unit is further configured to execute the first instruction at a second time, wherein the second time is later than the first time;
wherein the prediction unit is further configured to:
read the value stored in the second entry in the misprediction detection table in response to the execution of the first instruction; and
invalidate a result of the second instruction based on the value stored in the second entry.

16. The apparatus of claim 15, wherein the prediction unit is further configured to set a flag in a third entry in a load identification table in response to a determination that the value stored in the second entry in the misprediction detection table is greater than zero.

17. The apparatus of claim 16, wherein the prediction unit is further configured to read the flag in the third entry in the load identification table in response to a beginning a commit process for the second instruction at a third time, wherein the third time is later than the second time.

18. The apparatus of claim 17, wherein in response to a determination that the flag in the third entry is set, the prediction unit is further configured to:
modify the value stored in the first entry in the dependence prediction table; and
invalidate the result of the second instruction.

19. The apparatus of claim 15, wherein the prediction unit is further configured to increment a value stored in a fourth entry in a fourth table in response to the execution of the second instruction, wherein the second entry in the misprediction detection table is selected dependent upon a first portion of bits of the address, wherein the fourth entry in the fourth table is selected dependent upon a second portion of bits of the address, and wherein the first portion of bits and the second portion of bits are different.

20. The apparatus of claim 19, wherein the prediction unit is further configured to:
read the value stored in the fourth entry in the fourth table in response to the execution of the first instruction; and set a flag in a third entry in a load identification table in response to a determination that both the value stored in the second entry and the value stored in the fourth entry are greater than zero.

* * * * *